Feb. 26, 1957
C. H. AREND
2,783,060
BALL AND SOCKET HITCH
Filed Nov. 2, 1954
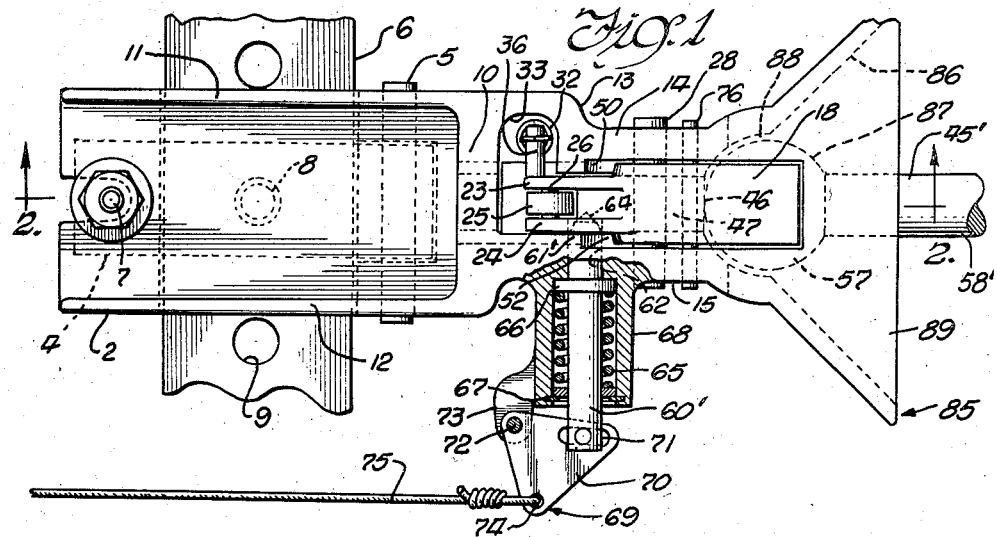
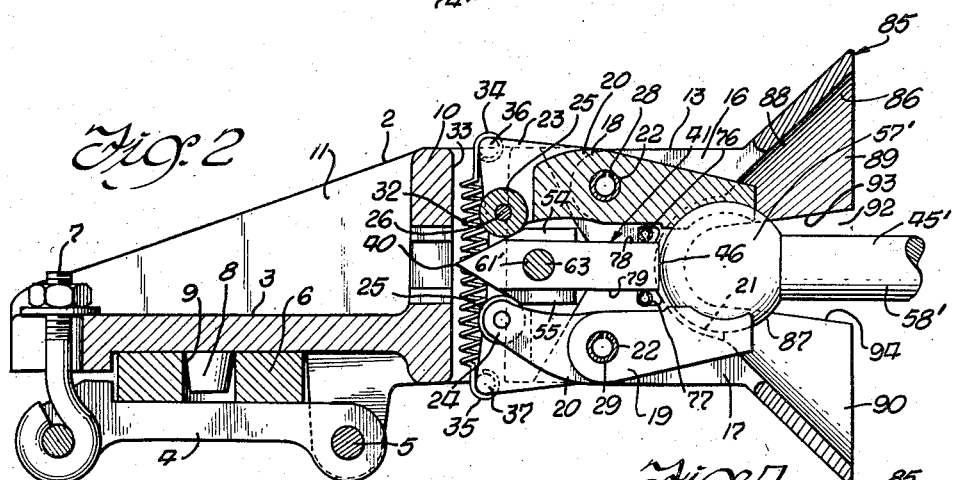
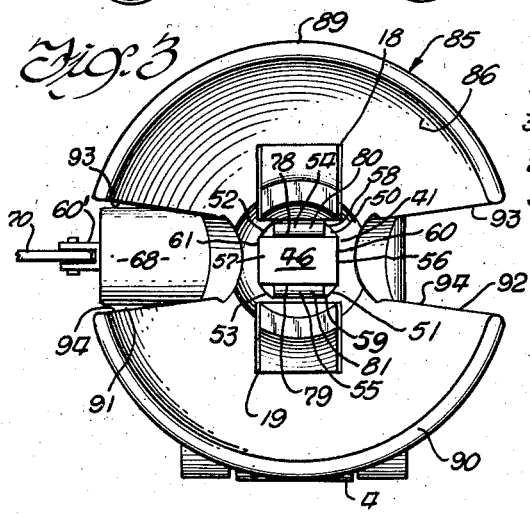
Inventor
Christopher H. Arend
Paul O. Pippel
Attorney

United States Patent Office 2,783,060
Patented Feb. 26, 1957

2,783,060

BALL AND SOCKET HITCH

Christopher H. Arend, Berwyn, Ill., assignor to International Harvester Company, a corporation of New Jersey Application November 2, 1954, Serial No. 466,321

7 Claims. (Cl. 280—509)

This invention relates to hitches, and more specifically to a novel and improved ball and socket hitch.

A general object of the invention is to provide a novel and simplified ball and socket hitch of improved design which will automatically couple upon the socket and the ball being brought together.

A more specific object of the invention is to provide a novel ball and socket joint wherein the parts are formed and arranged to provide a rugged construction and the socket providing an improved guide for directing the ball into coupling engagement with the jaws of the socket.

A further object of the invention is to provide a novel guide which permits extensive lateral swinging of the connection to accommodate maximum turning movement between the coupled members.

These and other objects of the invention will become more apparent from the specification and the drawings wherein:

Figure 1 is a plan view of the novel ball and socket hitch shown in association with a tractor drawbar fragmentarily shown and certain parts being shown in section;

Figure 2 is a vertical longitudinal sectional view taken substantially on the line 2—2 of Figure 1;

Figure 3 is a rear end view of the hitch with certain parts omitted in order to clarify the illustration; and Figure 4 is a view comparable to Figure 2 but showing the socket portion in unhitched position with respect to the ball.

Describing the invention in detail the hitch is provided with a shank portion 2, which incorporates a pair of clamping members 3 and 4 hingedly connected as at 5 and embracing a tractor drawbar 6 therebetween, and releasably interlocked with the drawbar by means of a swing bolt and nut assembly 7. The plate 3 is provided with a depending boss 8 which is adapted to enter any of the series of openings 9 in the drawbar 6.

The plate portion 3 is an integral part of the shank 2, which at its rearward end is provided with a transverse vertical web 10, which is rigidly interconnected at its lateral edges with the plate portion 3 by means of a plurality of gussets 11 and 12 upstanding from the plate 3 along the lateral margins thereof.

The wall member 10 forms the forward end of a rearwardly extending body portion 13 of the socket member of the hitch, the said body portion 13 having a pair of upright longitudinal side walls 14 and 15 disposed in generally parallel relationship and defining therebetween upper and lower jaw receiving slots 16 and 17 elongated longitudinally of the body for receiving upper and lower jaw members 18 and 19 respectively.

The jaw members 18 and 19 are of looking glass symmetry, and each comprises an elongated body 20, provided at its outer end with an inwardly facing arcuate socket portion or cavity 21 and intermediate its ends being provided with a pivot opening 22, and at its opposite end being bifurcated to provide a pair of laterally spaced lugs 23 and 24, the lugs 23 and 24 of each jaw member receiving a bearing or abutment means in the form of a roller 25 therebetween, which is journalled on a pin 26 extending through and mounted on the lugs 24 and 23.

The jaw member 18 is pivoted at its pivotal opening 22 by means of a transverse pin 28 which extends through and is mounted on the walls 14 and 15 of the body portion, and similarly the jaw members 18 and 19 are pivoted through its opening 22 intermediate its ends by means of a pin 29 which extends through and is mounted on the walls 14 and 15. It will be appreciated that the pins 28 and 29 are of C-shaped resilient construction and formed of spring steel or the like and are therefore self-locking in the apertures of the walls 14 and 15.

The rollers 25 of the jaw members 18 and 19 are positioned adjacent to the front end of the body portion or housing and in the open position of the socket as shown in Figure 4, are urged into engagement with each other as at 31 by means of a tension spring 32, which extends through a vertical slot 33 in the body portion 13, the slot 33 being formed in the wall 14 and the spring 32 having upper and lower hook ends 34 and 35 which are hooked around pins or lugs 36 and 37 of the upper and lower jaw members 18 and 19, the said pins 36 and 37 being formed integral with the ears 23 of said members 18 and 19 and extending laterally outwardly of the respective jaw members 18 and 19.

The opposed rollers 25 define a rearwardly facing bight 39 between which enters the pointed end 40 of a wedge-shaped plunger generally designated 41, the plunger having forwardly converging top and bottom wedge surfaces or abutment means 42 and 43 which are adapted to spread the inner ends 44 and 45 of the jaw members 18 and 19 upon the plunger 41 being moved inwardly or forwardly within the housing 13 attendant to the ball member 45' being entered into the socket and engaging the outer striking end 46 at the rear end of the elongated shank portion 47 of the plunger or operating member 41. The plunger is disposed between the upper and lower jaw members 18 and 19 and has motion of translation longitudinally of the housing and at its intermediate portion 48 is of cruciform cross section as best seen in Figure 3. The plunger is guided within a complementary cruciform shaped slot defined by upper and lower shoulders 50 and 51 on the wall 14 and shoulders 52 and 53 on the wall 15. It will be observed that the intermediate portion comprises the upper and lower wings or projections 54 and 55 (Figure 3) and the lateral wings or projections 56 and 57 which are guided in the complementary slot portions 58, 59, 60 and 61 respectively at approximately the center of the body 13 as defined by the said shoulders 50 through 53.

It will be seen from a consideration of Figure 1 that the spring 32 is disposed at one side of the forward end portion of the plunger and that the jaw members 18, 19 are maintained in closed or clamping position about the ball 57' of the member 45', which includes the shank 58' which may form the part of an implement to be drawn or connected thereto in any convenient manner as by a bracket formed on the shank 58' as will be readily understood by those skilled in the art.

The plunger is held in locked position by means of a locking element or pin 60', which has an inner end portion 61' extending through a transverse opening 62 in the wall 15 of the body, and entering an opening 64 in one side of the shank portion 48 of the plunger 41 as the plunger is moved from its extended position as shown in Figure 4 to its retracted position as shown in Figure 2 whereupon the opening 64 registers with the plunger 60 which is spring urged transversely of the plunger 41 into the socket 64 by means of a spring 65 compressed between a shoulder 66 formed integral with the plunger 60 and a snap ring 67 which snaps into a housing 68 formed integral with the wall 15 and projecting outwardly therefrom. It will be understood that the spring 65 being under compression between the shoulders 66 and 67 constantly urges the locking pin 60 inwardly so that upon the ball and socket being coupled as shown in Figure 2, the plunger 41 is locked in the position shown in Figure 2, and the ball 57' is retained clamped between the socket portions of the jaw members.

The plunger may be released to permit opening of the jaw members by a release mechanism, generally designated 69, which comprises a bell crank lever 70 having a slotted pivotal connection as at 71 with the outer end of the locking pin 60 and pivoted at its elbow as at 72 to a lug structure 73 formed integral with the spring housing and the bell crank being pivoted at the outer end of its opposite leg portion as at 74 to one end of a cable or lanyard 75, which is adapted to be pulled to the left as seen in Figure 1 whereby rotating the lever 70 in a clockwise direction as seen in Figure 1 and moving the pin 60' outwardly and its inner end out of the socket 64 of the plunger. Under such conditions the spring 32 acts to pull the inner ends of the locking jaws 18 and 19 toward each other while at the same time tending to wedge the member 41 rearwardly and at the same time tending to spread the rear or outer portion or socket portion extremities of the jaws apart to release the ball 57' of the mating member 45' and relative longitudinal movement between the socket portion and the ball portion releases the two whereby they are separated.

It will be noted that rearward movement of the plunger is limited by means of a pair of upper and lower stop members 76 and 77 which extend transversely of the plunger 41 in guiding engagement to the top and bottom surfaces 78 and 79 of the shank portion 47 of the plunger and abuttable with the rear edges 80 and 81 of the upper and lower wings 54 and 55 of the intermediate portion of the plunger as best seen in Figure 4.

It will be seen in Figure 4 that the striking end 46 of the plunger projects in the open position of the socket, into the vortex of the hollow shaped generally conical guide, generally designated 85 and which comprises a substantially frusto-conical inner surface 86 in guiding engagement with the periphery 87 of the ball 57' so as to lead the ball to the vortex 88 of the guide whereat the guide is shaped as spherical segments of a radius larger than the base and whereat the said plunger 41 is positioned between the opposed top and bottom jaws of the jaw members in the open position of the socket. It will be seen that the guide members 85 is divided into upper and lower portions 89 and 90 and that these portions define slots 91 and 92 at opposite sides of the guide and that the slots are in alignment laterally across the guide and each slot has rearwardly diverging upper and lower edges 93 and 94 to accommodate the passage of the shank portion 58' therebetween and thereby permitting extreme angular displacement between the ball member 45 and the socket in a substantially horizontal plane.

It will be understood that the embodiment herein shown and described is merely by way of explanation and not limitation and that the scope of the invention is to be gauged only by the appended claims.

What is claimed is:

1. In a ball and socket hitch the combination of a draft member incorporating a ball at one end, a socket member having a body including means at one end for mounting thereof on an associated vehicle, a guide connected to the opposite end of said body and shaped in the form of a cone flaring outwardly from the body, said body having a vertical slot therethrough extending lengthwise of the body and open at one end to the vortex of said conical guide, a pair of top and bottom jaw members in said slot and each extending lengthwise of the slot and pivoted intermediate its ends to said body on a substantially horizontal axis, each jaw member having an outer end spherical jaw portion disposed in opposing relation to the jaw portion of the other jaw member and said jaw portions of said top and bottom members, described in the open position of the socket member, disposed at the top and bottom of said vortex of the guide and said jaw members having inner ends with bearing means thereon and in engagement with each other in the open position of said jaw members to limit opening movement of said jaws, an operating member disposed between said jaw members and slidably supported from said body for movement lengthwise of said slot, said operating member having an outer end extending in the open position of said socket into said vortex for engagement and inward movement of said operating member by said ball when the ball is being inserted into said guide for coupling with said socket member, said operating member having an inner end wedge portion provided with top and bottom wedge faces converging toward the inner end of said member and adapted to wedge between said inner ends of said jaw members in engagement with said bearing means thereon for rotating said jaw members to clamping position about said ball attendant to said ball moving said operating member inwardly of said body, a tension spring extending vertically and hooked at its upper end to the inner end of said top jaw member and at its lower end to said bottom jaw member for constantly drawing said inner ends of said jaw members toward each other, and a releasable lock for said operating member comprising a bolt slidably supported from said body for movement transversely of said operating member into a registering aperture therein, and spring means stressed between said bolt and said body for urging said bolt into locking engagement with said operating member.

2. The invention according to claim 1 and said operating member presenting intermediate its ends transversely extending top and bottom abutment surfaces facing toward the outer end thereof, and stop means connected to said body and extending across said slot above and below said operating member in guiding relation thereto and abuttable with said abutment surfaces to limit outward movement of said operating member.

3. In a ball and socket hitch, a socket member, described in its uncoupled open position comprising a body having means at one end for connection to an associated vehicle, a frusto-conical guide flaring outwardly from the opposite end of said body, said body having an elongated slot with an open end through said opposite end of said body and communicating with said guide, a pair of opposed jaw members pivoted intermediate their ends to said body on generally parallel axes and having outer ends presenting jaws at opposite sides of said open end of the slot and facing said guide, said jaw members having inner ends, rollers journalled on said inner ends of said jaw members and in abutment with each other and developing a bight facing toward said open end of said slot, spring means associated with said jaw members for constantly biasing the same to open position with said inner ends drawn together and said rollers in engagement, an operating element having an outer end projected from said open end of the slot into said guide, said element disposed between said jaw members and having an inner end with inwardly converging faces directed toward said bight, cooperative guide means on said element and said body for guiding said element for movement lengthwise of the slot, and means on said body and on said element for limiting outward movement of said element.

4. The invention according to claim 3 and further characterized in that said operating element is provided with a transverse aperture, a spring loaded bolt carried on said body transversely of said operating member, said bolt and said aperture having a position of registry in the closed position of said socket whereat said bolt enters said aperture to lock said socket.

5. For use with a draft member having a shank with a ball at one end a socket assembly including a body with a frusto-conical guide flaring outwardly from one end of said body, said guide comprising vertically spaced top and bottom portions defining at opposite sides of said guide a pair of slots open through the outer edge of said guide and each slot defined by top and bottom margins diverging toward said outer edge of said guide, and said margins spaced a lesser distance apart than the diameter of the ball and a greater distance than the width of the shank whereby the shank is accommodated passage through the slots during relative horizontal angling movements between the draft member and the socket assembly, said slots having vertical dimensions throughout their lengths less than the diameter of the ball of the associated draft member.

6. A ball and socket hitch described in its uncoupled open position comprising a socket member having a body with means at one end for connection to an associated vehicle, guide means at the opposite end of said body for guiding a ball of an associated hitch part into the socket, said body having an elongated slot with an open end through said opposite end of said body and communicating with said guide means, a pair of opposed jaw members pivoted intermediate their ends to said body on generally parallel axes and having outer ends presenting jaws at opposite sides of said open end of the slot and facing said guide means, said jaw members having inner ends, means on said inner ends of said jaw members developing a bight facing toward said open end of the slot, means operatively associated with said jaw members for constantly biasing the same to open position with said inner ends drawn to each other, an operating element having an outer end projected from said open end of the slot into said guide means, said element disposed between said jaw members and having an inner end with inwardly converging faces directed toward said bight, cooperative guide means on said element and said body for guiding said element for movement lengthwise of said slot, said element movable inwardly with its inner end wedged between and the faces thereon engaging said means on the inner ends of said jaw members and coincidental withdrawal of said outer end of said element from said guide means and attendant rotation of said jaw members to closed position about an associated ball.

7. A ball and socket hitch described in its uncoupled open position comprising a socket structure having a body with means at one end for connection to an associated vehicle, guide means at the opposite end of said body for guiding a ball of an associated hitch part into the socket, said body having an elongated slot with an open end through said opposite end of the body and communicating with said guide means, a pair of opposed jaw members pivoted intermediate their ends to said body on generally parallel axes and having outer ends presenting jaws at opposite sides of said open end of said slot and facing said guide means, said jaw members having inner ends, abutment means on said inner ends facing toward the open end of the slot, means operatively associated with said jaw members for releasably holding them in open position with said inner ends drawn toward each other, an operating element having an outer end projected from said open end of the slot into said guide means, said element disposed between said jaw members and having an inner end with abutment means thereon cooperatively associated with said abutment means on the inner ends of said jaw members for rotating said jaw members to closed position attendant to said element being moved inwardly of said slot pursuant to movement of said element by engagement at its outer end with a ball of an associated hitch part entered in said guide means and in between said jaws, and means for releasably holding said element in said last-mentioned position carried on said body and releasably interlocked with said element.

References Cited in the file of this patent

UNITED STATES PATENTS 2,230,242  Goodrich _____ Feb. 4, 1941

FOREIGN PATENTS 330,878  Italy _____ Oct. 25, 1935